(12) United States Patent
DeNuccio

(10) Patent No.: US 6,979,478 B1
(45) Date of Patent: Dec. 27, 2005

(54) PAINT FOR SILVER FILM PROTECTION AND METHOD

(75) Inventor: Ronald J. DeNuccio, Greensboro, NC (US)

(73) Assignee: Hilemn, LLC, Greensboro, NC (US)

( * ) Notice: Subject to any disclaimer, the term of this patent is extended or adjusted under 35 U.S.C. 154(b) by 242 days.

(21) Appl. No.: 10/210,678

(22) Filed: Aug. 1, 2002

(51) Int. Cl.$^7$ .............................. B05D 1/38; B05D 3/02; B05D 3/06; B05D 5/06; C08F 2/38; C08F 2/48

(52) U.S. Cl. ..................... 427/508; 427/512; 427/162; 427/164; 427/386; 427/388.1; 427/388.3; 427/410

(58) Field of Search ................................. 427/508, 512, 427/514, 517, 518, 161, 164, 165, 168, 169, 427/404, 407.1, 407.2, 409, 410, 412.12, 427/417, 419.1, 419.5, 419.6, 162, 385.5, 427/386, 388.1, 388.3, 389.7

(56) References Cited

U.S. PATENT DOCUMENTS

| | | | |
|---|---|---|---|
| 3,117,099 A | | 1/1964 | Proops et al. |
| 3,798,050 A | | 3/1974 | Franz et al. |
| 3,874,987 A | | 4/1975 | Young |
| 3,900,614 A | | 8/1975 | Lando |
| 3,956,535 A | | 5/1976 | Lozier |
| 4,021,314 A | | 5/1977 | Dafter, Jr. |
| 4,084,021 A | * | 4/1978 | Sandvig |
| 4,136,216 A | | 1/1979 | Feldstein |
| 4,169,171 A | | 9/1979 | Narcus |
| 4,222,778 A | | 9/1980 | Nuzzi et al. |
| 4,241,105 A | | 12/1980 | Mayweather |
| 4,285,992 A | | 8/1981 | Buckwalter, Jr. |
| 4,303,696 A | * | 12/1981 | Brack |
| 4,358,507 A | * | 11/1982 | Senaha et al. ............. 428/429 |
| 4,388,345 A | * | 6/1983 | Kishida et al. |
| 4,406,826 A | * | 9/1983 | Morgan et al. ............. 252/512 |
| 4,463,030 A | * | 7/1984 | Deffeyes et al. ............ 427/216 |
| 4,694,138 A | * | 9/1987 | Oodaira et al. ........ 219/121.85 |
| 4,745,003 A | * | 5/1988 | Sirkoch et al. |
| 4,759,961 A | * | 7/1988 | Kato et al. ................ 427/407.1 |
| 5,096,785 A | | 3/1992 | Somerhausen et al. |
| 5,135,780 A | * | 8/1992 | Kissel ......................... 427/404 |
| 5,206,200 A | | 4/1993 | Bush et al. |
| 5,212,261 A | | 5/1993 | Stierman |
| 5,240,776 A | | 8/1993 | Servais et al. |
| 5,296,297 A | | 3/1994 | Servais et al. |
| 5,330,796 A | * | 7/1994 | Kasari et al. ............. 427/407.1 |
| 5,374,451 A | | 12/1994 | Servais et al. |
| 5,419,926 A | | 5/1995 | Soltys |
| 5,543,227 A | | 8/1996 | Hughes et al. |
| 5,660,937 A | * | 8/1997 | Ishidoya et al. .......... 427/407.1 |
| RE35,640 E | * | 10/1997 | Hotta et al. |
| 5,700,581 A | * | 12/1997 | Sachdev et al. ............. 428/447 |
| 6,017,580 A | | 1/2000 | Soltys |
| 6,103,387 A | * | 8/2000 | Yamamoto et al. ....... 427/407.1 |
| 6,218,019 B1 | | 4/2001 | Soltys |
| 6,251,482 B1 | | 6/2001 | Laroche et al. |
| 6,303,229 B2 | * | 10/2001 | Takahama et al. ........... 427/515 |
| 6,515,649 B1 | * | 2/2003 | Albert et al. ................ 345/107 |
| 6,680,356 B2 | * | 1/2004 | Huynh-Ba ................. 427/407.1 |
| 6,749,307 B2 | * | 6/2004 | Laroche et al. ............. 359/838 |

OTHER PUBLICATIONS

J.Grant, ed., "Hackh's Chemical Dictionary", 3$^{rd}$ ed., McGraw-Hill Book co., Ink., N.Y., 1944 (no month), excerpt p. 520.*

Abstract of Chinese Patent 1126182A.*

* cited by examiner

Primary Examiner—Marianne Padgett

(57) ABSTRACT

A paint and method are divulged for protecting the silver film of mirrors. The paint in its preferred embodiment includes a metal carboxylate which will contribute metal ions, namely stannous octoate for the contribution of stannous(II) ions in an amount of 0.5% or greater by weight. Alternate methods of the invention utilize an additional coating over the paint, such as an acrylic, epoxy or blend thereof which is UV curable. In another form of the paint, copper octoate is utilized in a minimum amount of 0.5% by weight for contribution of copper(II) ions.

10 Claims, No Drawings

PAINT FOR SILVER FILM PROTECTION AND METHOD

FIELD OF THE INVENTION

This invention relates to the production of mirrors and specifically to a method for protection of silver films by using a paint containing metal ions as from a carboxylic acid salt (metal carboxylate) such as an octoate, tallate, rosinate, laurate, oleate, octadecanoate, neodecanoate, linoleate, naphthenoate, versatate or hexanoate. Specifically Sn(II) ions as from stannous octoate or Cu(II) ions from copper octoate are used in a paint to eliminate or greatly reduce delamination of the silver film from the glass substrate.

DESCRIPTION OF THE PRIOR ART AND OBJECTIVES OF THE INVENTION

Mirrors are generally produced using a process in which a solution of ammoniacal silver nitrate is reacted with a suitable reducing agent providing a bright film of metallic silver. The reaction takes place on the surface of a substrate (usually glass) that has been sensitized with a solution containing a stannous or palladous salt, (chloride or fluoride salts). The substrate is usually flat but articles having different shapes and composed of different materials may be used.

The first step of conventional processing usually involves a mechanical cleansing of the glass substrate surface using a fine cerium or silicate polishing compound but may also include detergents to remove dirt, grease, etc. After a thorough rinse, the glass surface is treated (sensitized) with a dilute stannous chloride solution. This sensitizing results in the glass surface populated by chemically bound Sn(II). The presence of Sn(II) allows the plating reaction to proceed quickly and smoothly and forms a more adherent silver film. After rinsing, ammoniacal silver nitrate and reducing agent solutions are applied to the glass surface simultaneously on a reciprocating, (traversing) arm for complete coverage. Time and temperature are adjusted as well as concentrations of the solutions in order to yield a suitable silver film. After silvering, the silvered surface is rinsed and may then be coated with a layer of copper usually accomplished with an acidic solution of cupric sulfate and a suspension of finely divided iron or zinc powder.

After copper plating, the mirror is painted to provide corrosion and abrasion resistance. The paints typically contain lead compounds, however, nonleaded materials have also been employed as shown in U.S. Pat. No. 5,543,227. The paints may contain binder systems composed of alkyd, acrylic, epoxy, polyester, polyurethane resins and combinations and may be modified as in acrylic modified alkyds, epoxy modified acrylics, etc. Typically, the paints are thermosetting utilizing melamine formaldehyde resins as cross-linking materials. Other useful cross-linking agents include urea-formaldehyde resins and isocyanates. The paints are most often solvent based but may include water or powder systems applied in one or two coats using a curtain, roll or electrostatic applicator. The mirrors may be subjected to various performance tests such as salt-fog, ASTM, C 1503-01 and CASS, ASTM B 368-97.

U.S. Pat. Nos. 5,374,451, 5,296,297 and 5,240,776 describe processes for treating a freshly silvered surface with solutions containing Cr(II), V(II or III), Ti(II or III), Fe(II), In(I or II), Cu(I), Al(III) and Sn(II). Such treatments result in the deposition of a small population of stannous ions onto the surface of the silver as an additional measure of corrosion protection. Solutions of palladium chloride and amino-functional silane are also described. U.S. Pat. Nos. 6,017,580 and 6,218,019 describe using stannous hydroxide derived from stannous chloride which may also include Sn(IV), Bi(III), Ag(I), Zn(II), Pb(II), Ce(III), Al(III), Fe(II), In(III), Ti(III) and La(III).

U.S. Pat. No. 6,251,482 describes a pretreatment of the glass surface with ions consisting of Bi(III), Cr(II), Au(III), In(III), Ni(II), Pd(II), Pt(II), Rh(III), Ru(III), Ti(III), V(III) and Zn(II) followed by silvering and subsequent application of the treatments described in U.S. Pat. Nos. 5,374,451, 5,296,297 and 5,240,776 for a copperless mirror. The pretreatments reportedly improve adhesion of the silver to the glass resulting in less delamination of silver. U.S. Pat. No. 4,285,992 uses solutions of rare earth lanthanides, (neodymium, praesodymium, erbium, lanthanum, samarium and dysprosium) in addition to palladium and stannous ions in a similar manner. The use of palladium chloride as a sensitizing agent in electroless plating processes is also seen in U.S. Pat. Nos. 3,956,535; 4,021,314; 3,798,050; 3,900,614 and 3,874,897.

Mirror manufacturing using conventional copper plating over silver films results in a copper effluent that requires special treatment and disposal as many municipal treatment plants require its removal from industrial wastewater. Chemical precipitation is the usual treatment employed which results in the generation of a waste sludge. Expensive alternative methods of regeneration using ion-exchange technology are seldom employed.

Conventional mirrors are sometimes subject to damage from ammonia-based cleaners due to the reactivity with the copper film or layer. The reaction of ammonia with the copper film usually occurs at the edges of a mirror and results in a visible blackening. To prolong the useful life of a mirror commercial sealant products have been developed to provide an extra measure of protection along the mirror edges.

Metal carboxylates are useful as driers for resins or paint systems containing unsaturated oils, (generally alkyd systems). The main function of metal driers is to accelerate the decomposition of peroxides generated by the reaction of oxygen with the oils. This increases the generation of free-radicals for promoting cross linking within the coating. The concentration of driers typically used for this function are small and may range from 0.01–0.08%/wt (metal basis). Other metal compounds are useful in modifying drier systems and may provide wetting and dispersion characteristics. Tin or Sn(II) compounds often find value as polyurethane catalysts in quantities of 0.001–0.01% by weight. Copper(II) compounds are generally used as lubricant additives.

U.S. Pat. No. 5,206,200 to Bush, et al., describes stannous octoate in modifying latent epoxy curing systems. Amine curing agents were modified with stannous octoate to increase the hydrolysis of certain latent amine curing agents. U.S. Pat. No. 5,212,261 to Steirman describes a similar application with certain alkali and alkaline earth metal carboxylates and certain cure modifiers.

Current technology for copperless mirrors as outlined above requires a treatment of the silver film with one or more solutions prior to painting. As a result, these methods require the modification of traditional copper plating with one or more steps, increasing the complexity of the manufacturing process. The current copperless art does not provide a reliable means for quantitative monitoring of the deposited metal such as by simple titration. The amounts of the metal (tin, palladium, silane, etc.) deposited are very small and not amenable to quick and accurate measurements. Methods are available to measure process conditions such as solution pH, conductivity, etc. but do not quantitatively determine the amount of metal deposited. Such determinations are necessary as insufficient amounts of metal deposited can be detrimental. Thus, quality assurance is not afforded with these older methods.

Many of the components described in the aforementioned patents utilize costly metal compounds like palladium chloride or contain metals that have an unacceptable level of toxicity, (nickel, vanadium and chromium in particular). Many mirrors which are produced as described also have a perceptible haziness when viewed under certain lighting. The haze is visible both before and after performance tests such as the CASS and salt-fog test. However, at this time it is not known whether the haze is linked to chemical treatments, associated with stresses (to the silver film) induced by the protective paints or both.

Excessive stress on silver films is usually visualized as a hazing, fogging or graining. Each point delamination causes a multitude of reflections giving the appearance of a white spot. Under magnification, foggy or hazy areas can be seen as consisting of thousands of such point delaminations i.e., a milky appearance. Graininess may be defined as a condition where far fewer point delaminations are present resulting in a mirror that still retains a great amount of reflectivity.

Thus, with the problems and disadvantages of prior art mirror manufacturing processes, the present invention was developed and one of its objectives is to provide a protective paint for silver mirror films utilizing positive metal ions from metal carboxylates, particularly stannous and copper carboxylates which contribute, respectively stannous(II) and copper(II) ions.

It is another objective of the present invention to provide a protective paint utilizing stannous octoate.

It is yet another objective of the present invention to provide a protective paint utilizing copper octoate.

It is still another objective of the present invention to provide protection for a silver film of a mirror using a paint containing a metal carboxylate and a UV curable coating over the metal carboxylate containing paint.

It is still a further objective of the invention to provide a coating which includes an epoxy resin for placement over silver film of a mirror which has first been painted with a metal carboxylate containing paint.

It is yet a further objective of the present invention to provide a method for further protecting the painted silver film of a mirror using a UV curable epoxy/acrylate resin.

It is still another objective of the present invention to provide a method for protecting a silver film utilizing a paint which is easy to apply and which is very durable.

Various other objectives of the present invention will become apparent to those skilled in the art as a more detailed description is set forth below.

SUMMARY OF THE INVENTION

The aforesaid and other objectives are realized by the present invention which describes paints and methods of providing protection to a mirror silver film using paints incorporating a metal carboxylate such as a stannous (tin) carboxylate or a copper carboxylate which contributes metal ions. These paints require no prior treatments to the silver film, thus avoiding the drawbacks of prior multistep processes. Copper plating and other steps conventionally employed for silver film protection are eliminated. The silver film so painted remains free of haze and graininess attributed to delamination of the silver film from the glass substrate. The silver film so painted also will not blacken or deteriorate along the edges. UV curable coatings can also be applied over the paint for additional protection which are then cured by conventional UV light processes.

DETAILED DESCRIPTION OF THE PREFERRED EMBODIMENTS AND OPERATION OF THE INVENTION

It has been found that certain stannous and copper carboxylates such as octoates, tallates, rosinates, laurates, oleates, octadecanoates, neodecanoates, linoleates, naphthenoates, versatates and hexanoates, preferably stannous octoate and copper octoate can greatly minimize or eliminate the occurrence of point delaminations in silver films when used in paints by readily contributing certain metal ions. The resulting painted mirrors have no haze and will readily pass standard CASS and Salt-fog tests.

The preferred carboxylates are certain carboxylic acid salts of Sn(II) (stannous octoate ($C_8H_{16}O_2$)$_2$Sn) and Cu(II) (copper octoate ($C_8H_{16}O_2$)$_2$Cu) with stannous octoate being the most preferred. These octoates are liquids and afford the advantage of easy delivery and dispersion throughout a solvent based paint. These octoates may be added directly, or predispersed into a solvent before incorporation into a paint base. Solvents may include those typically used in paints such as organic aromatic solvents: acetates, glycol ethers, alcohols, and others. Solvents that may also be used include, certain high dielectric solvents: n-methyl pyrolidone, NN-dimethylformamide, formamide, acetone, DMSO, water, etc.

Resins used in the paint base of the invention include, preferably alkyd, polyester, acrylic, epoxy, epoxy modified acrylic and other modified resins. Cross-linking of a parent resin may be accomplished through the use of melamine-formaldehyde, urea-formaldehyde, isocyanates, amines and other resins.

It has been found that the benefits of using the metal octoates described contributing stannous or copper ions (which minimize or eliminate the occurrence of point delamination in silver films) can be enhanced by controlling dimensional changes as the paint cures. Excessive dimensional changes occurring during cure coupled with strong adhesion to the silver film exerts stresses on the silver film that may exceed the adhesive forces holding the silver film to the glass substrate. This may result in a loss of clarity of the mirror surface, (slight or pronounced clouding or hazing) caused by release or delamination of silver from the glass. Control of parent resin properties, (hydroxy or carboxy content, MW (molecular weight), etc.) along with the choice and concentration of cross-linking agents are important in balancing shrinkage, adhesion as well as storage stability of the paint. Greater dimensional stability can be imparted by the use of certain "ancillary" or "modifying" resins. Epoxy resins of the bisphenol A type including but not limited to, Epon 1001, 1007 and 1009, (Resolution Performance Products of Houston, Tex.) are useful alone and in combination with acrylic systems cross-linked with melamine-formaldehyde resins. In addition to epoxies of the bis-phenol A type, alternate modifying resins which contribute to the rigidity of the coating include certain thermoplastic resins, polyhydroxyethers (phenoxy resins) for example. These modifying resins may be cross-linked or remain uncross-linked in the coating.

In some examples, the performance of paints containing metal carboxylates such as stannous octoate can be improved by coating the paint with an ultraviolet curable coating. These coatings typically consist, but are not limited to a mixture of monomeric and oligomeric acrylates that, when in the presence of a photoinitiator, will spontaneously polymerize upon exposure to ultraviolet light. Such UV curable coatings can contain a certain quantity of filler materials in order to obtain a desired level of gloss and hardness. These filled coatings are commonly used in the mirror industry to provide a greater degree of scratch protection than is normally afforded by the primary paint, thus minimizing damage during handling. Such coatings can be applied over the primary paint in thicknesses of 0.0001–0.0005 inch (0.00254–0.0127 mm), however greater thicknesses may be employed. The use of the UV curable coating in the present invention, while conveying scratch resistance can afford greater dimensional stability to the paint in addition to providing useful barrier properties against penetration by moisture and corrosive compounds.

EXAMPLE 1

Preferred Paint Base

|  | %/wt |
|---|---|
| Hydroxy-functional acrylic resin (60% solids) | 10.17 |
| (Cook Composites and Polymers Co., Chatam, VA 24531) | |
| Epoxy resin 1001-G-70 (70% solids) | 26.18 |
| (Resolution Performance Products, supra) | |
| Surface additives and dispersants (total %) | 1.0 |
| Titanium dioxide | 4.6 |
| Calcium carbonate | 11.21 |
| Barium sulfate | 4.54 |
| Fumed silica | .18 |
| Talc | 9.96 |
| Lampblack | .29 |
| Lead cyanamide | 1.39 |
| Lead sulfate | 4.24 |
| Zinc oxide | 3.76 |
| Melamine, Resimine Hm-2608 | 3.22 |
| (Solutia Corp of St. Louis, MO 63166) | |
| Isobutyl alcohol | 1.95 |
| Normal butyl acetate | 15.45 |
| Butyl cellosolve | .91 |
| Aromatic 100 | .95 |
| (Union Carbide Corp., Danbury, CT 06817) | |
| | 100% |

The preferred paint base was prepared (containing 4% lead by weight) conventionally by blending the ingredients and dispersing the pigments to a 6+ Hegman (fineness of grind). Several glass panels with a standard silver film (70–75 mg silver/ft$^2$ were coated with the above (preferred) base coat and cured three minutes between 220–260° F. with a maximum temperature of 260° F. Dried film thickness were between 0.0012 and 0.0018 inch (0.03047–0.04572 mm). Additional silvered glass panels were likewise prepared and also covered with an ultraviolet cured, epoxy-acrylate, scratch-resistant coating (Spraylat of Pelham, N.Y.; product # DKKC0264) to a thickness of 0.0001–0.0002 inches (0.00253–0.00508 mm). These panels were tested using the CASS test previously described and evaluated for evidence and/or extent of silver delamination.

The preferred paint base described above was then modified with the addition of stannous(II) ions by adding 3% by weight of stannous octoate, (Tegokat 129, supplied by Performance Chemicals Division of Goldschmidt AG, Essen, Germany). This yielded 0.86% Sn (metal basis) on formula, (28.7% Sn/wt of stannous octoate). Conventional silver coated glass panels were painted and cured as described both with and without an ultraviolet cured coating and were subjected to CASS testing. The test results are shown below:

TABLE 1

Effectiveness of stannous octoate.

| Test Condition: | UV Curable Coating: | Observations: |
|---|---|---|
| No stannous octoate | No | Surface extremely hazy, poorly reflective. |
| No stannous octoate | Yes | Surface extremely hazy, poorly reflective. |
| 3%/wt stannous octoate | No | Reflective surface clear and free of point delaminations. |
| 3%/wt stannous octoate | Yes | Reflective surface clear and free of point delaminations. |

Note:
None of the samples had edge corrosion.

Note: None of the samples had edge corrosion.

EXAMPLE 2

Range of Usefulness

Additional paints having increased concentrations of stannous octoate were used as samples for preparation and testing as previously described. The UV curable coating was again applied and cured by conventional application of ultraviolet (UV) light. The samples contained 0, 0.5, 1, 1.5, 3, 6, 9 and 12% stannous octoate by weight.

TABLE 2

Range of Effectiveness of Stannous Octoate in Control of Silver Film Delamination.

| Test Condition (by weight) | UV Curable Coating | Observations |
|---|---|---|
| No stannous octoate | No | Heavy population of pinpoint delaminations. Light edge corrosion, (0–2 mm, 2 sides only). |
| No stannous octoate | Yes | Pinpoint delaminations reduced by approx. 50%. Light edge corrosion, (0–1 mm 1 side). |
| .5% stannous octoate | No | Pinpoint delaminations further reduced by approx. 50%. No edge corrosion. |
| .5% stannous octoate | Yes | A few pinpoint delaminations visible but almost completely free. No edge corrosion. |
| 1.0% stannous octoate | No | Pinpoint delaminations reduced further from .5% stannous octoate. No edge corrosion. |
| 1.0% stannous octoate | Yes | No pinpoint delaminations visible. No edge corrosion. |
| 1.5% stannous octoate | No | No pinpoint delaminations visible. No edge corrosion. |
| 1.5% stannous octoate | Yes | No pinpoint delaminations visible. No edge corrosion. |

TABLE 2-continued

Range of Effectiveness of Stannous Octoate in Control of Silver Film Delamination.

| Test Condition (by weight) | UV Curable Coating | Observations |
|---|---|---|
| 3% stannous octoate | No | No pinpoint delaminations visible. No edge corrosion. |
| 3% stannous octoate | Yes | No pinpoint delaminations visible. No edge corrosion. |
| 6% stannous octoate | No | No pinpoint delaminations visible. No edge corrosion. |
| 6% stannous octoate | Yes | No pinpoint delaminations visible. No edge corrosion. |
| 9% stannous octoate | No | No pinpoint delaminations visible. No edge corrosion. |
| 9% stannous octoate | Yes | No pinpoint delaminations visible. No edge corrosion. |
| 12% stannous octoate | No | No pinpoint delaminations visible. No edge corrosion. |
| 12% stannous octoate | Yes | No pinpoint delaminations visible. No edge corrosion. |

The results show that stannous(II) ions contributed by the stannous octoate controlled the occurrence of point delaminations over a wide range of concentrations. Also illustrated is the advantage of the UV curable coating with low concentrations of stannous octoate.

EXAMPLE 3

100% Acrylic and the Need for Modifying Resin and/or UV Coating

This example illustrates the advantage of including an epoxy modification and UV curable coating. The coating in Example 1 was prepared except that all epoxy resin solids were removed and replaced with an acylic resin. To one portion of this paint was added 3% wt stannous octoate. Another portion contained no tin compound (stannous octoate). Panels were prepared with and without the UV curable coating and were CASS tested and examined for silver delaminations.

TABLE 3

Effect of 100% Acylic Composition with and without Stannous Octoate

| Test Condition: | UV Curable Coating: | Observations: |
|---|---|---|
| No stannous octoate | No | Reflective film was extremely hazy from numerous point delaminations. |
| No stannous octoate | Yes | Reflective film was extremely hazy from numerous point delaminations. |
| 3% stannous octoate | No | Some haze still visible but greatly reduced. |

TABLE 3-continued

Effect of 100% Acylic Composition with and without Stannous Octoate

| Test Condition: | UV Curable Coating: | Observations: |
|---|---|---|
| 3% stannous octoate | Yes | Haze gone but many point delaminations still visible. |

Without stannous octoate, all reflectivity was lost and the UV curable coating, essentially made no difference. With stannous octoate there was great improvement with greater improvement using the UV curable coating. However, the persistence of point delaminations illustrated the need for additional modification of the formula by adding an uncrosslinked epoxy resin.

EXAMPLE 4

Effects of Epoxy Modification Controlling Silver Film Delamination

In this example, a range of proportions of epoxy resin to acrylic resin are evaluated. The epoxy resin solids portion consisted of a blend of 75%/wt Epon 1001 and 25%/wt Epon 1009. The amount of epoxy resin solids to acrylic resin solids were adjusted to different proportions according to Table 6. All samples contained 2.46%/wt stannous octoate. All samples were tested with and without the UV curable coating applied. A 100% epoxy resin sample was also evaluated and cured with 2%/wt TETA (tetraetylenetetramine) added just prior to use.

TABLE 4

Effects of Epoxy Resin Addition on the Control of Silver Film Delamination.

| Epoxy/Acrylic resin (%)/wt | UV | Observations |
|---|---|---|
| 0/100 | No | Reflective film had a visible haze from numerous point delaminations. |
| 0/100 | Yes | Point delaminations reduced in number but still visible. |
| 25/75 | No | Reflective film was free of visible haze but still had numerous point delaminations. |
| 25/75 | Yes | Point delaminations reduced in number but still visible. |
| 35/65 | No | Point delaminations still present but fewer than at 25% epoxy. |
| 35/65 | Yes | No point delaminations. |
| 55/45 | No | No point delaminations |
| 55/45 | Yes | No point delaminations. |
| 65/75 | No | No point delaminations. |
| 65/75 | Yes | No point delaminations. |
| 75/25 | No | No point delaminations. |
| 75/25 | Yes | No point delaminations. |
| 100/0 | No | Hazy with up to 5 mm edge delamination. |
| 100/0 | Yes | No point or edge delaminations. |

Point delaminations as shown above were effectively eliminated by modifying the coating with as little as 55%/wt epoxy resin(epoxy/acrylic solids). In addition, the presence of the UV curable coating improved performance of samples with a reduced epoxy resin modification levels. In the case of the 100% epoxy resin, the UV curable coating was critical in controlling the occurrance of point delaminations.

EXAMPLE 5

Effects of Copper Octoate Addition Controlling Silver Delamination

A paint using the base of Example 1 was prepared containing 0.88%/wt Cu(II) ions in the form of an octoate (12% Copper Chem-All as supplied by OMG Americas, Cleveland, Ohio 44113). Glass mirror panels as conventional were prepared with and without the UV curable coating to illustrate its contribution to delamination control.

TABLE 5

Range of Copper Octoate Effectiveness in Controlling Silver Delaminations.

| Test | UV Curable Coating | Observations |
| --- | --- | --- |
| No copper octoate | No | Extremely hazy reflective surface. |
| No copper octoate | Yes | Very hazy, but improved. |
| .5% copper octoate | No | Many point delaminations visible. |
| .5% copper octoate | Yes | No point delaminations. |
| 1.0% copper octoate | No | Many point delaminations visible. |
| 1.0% copper octoate | Yes | No point delaminations. |
| 1.5% copper octoate | No | Many point delaminations visible. |
| 1.5% copper octoate | Yes | No point delaminations. |
| 3.0% copper octoate | No | Many point delaminations visible. |
| 3.0% copper octoate | Yes | No point delaminations. |
| 6.0% copper octoate | No | Many point delaminations visible. |
| 6.0% copper octoate | Yes | No point delaminations. |
| 9.0% copper octoate | No | Many point delaminations visible. |
| 9.0% copper octoate | Yes | No point delaminations. |
| 12.0% copper octoate | No | Many point delaminations visible. |
| 12.0% copper octoate | Yes | No point delaminations. |

As little as 0.5%/wt copper octoate with the UV curable coating was effective in controlling the occurrence of point delaminations. The need for the UV curable coating in eliminating point delaminations was very evident. The results showed that copper octoate contributed sufficient copper(II) ions and was useful in controlling point delaminations but not as effective as stannous(II) ions.

Other stannous and copper carboxylates can be used to contribute stannous(II) or copper(II) ions as it is the metal ion that confers the desired properties. They include the carboxylates as found in stannous or copper tallates, stannous or copper rosinates, stannous or copper laurates, stannous or copper oleates, stannous or copper octadecanoates, stannous or copper neodecanoates, stannous or copper linoleates, stannous or copper naphthenoates, stannous or copper versatates or stannous or copper hexanoates for protection of the silver film as described above.

The illustrations and examples provided herein are for explanatory purposes and are not intended to limit the scope of the appended claims.

I claim:

1. A method of protecting a silver film deposited on a substrate to prevent the silver film from delaminating, comprising the steps of:
   a) preparing a paint base by mixing a first cross linkable resin selected from the group consisting of: alkyd, polyester, acrylic, epoxy and epoxy modified acrylic resins, a second cross linking resin selected from the group consisting of: melamine-formaldehyde, urea-formaldehyde, isocyanates and amine resins, a modifying resin selected from the group consisting of epoxy and phenoxy resins and a metal carboxylate selected from the group consisting of: octoates, tallates, rosinates, laurates, oleates, octadecanoates, neodecanoates, linoleates, naphthenoates, versatates and hexanoates;
   b) applying the paint base to the silver film;
   c) curing the paint base with heat to cross link the resins; and
   d) contributing metal II ions from the selected metal carboxylate to the cured paint to thereby prevent the silver film from delaminating.

2. The method of claim 1 wherein preparing the paint base comprises the step of first selecting an acrylic resin, secondly selecting a melamine-formaldehyde resin, thirdly selecting an epoxy modifying resin and fourthly selecting a metal octoate.

3. The method of claim 1 wherein mixing a metal carboxylate comprises the step of mixing stannous octoate.

4. The method of claim 3 wherein mixing stannous octoate comprises the step of mixing stannous octoate in the amount of 1–3% by weight.

5. The method of claim 1 wherein mixing a metal carboxylate comprises the step of mixing copper octoate.

6. The method of claim 5 wherein mixing copper octoate comprises the step of mixing a least 0.5% copper octoate by weight.

7. The method of claim 1 wherein applying the paint base comprises the step of painting the silver film with a paint base comprising 1% stannous octoate by weight.

8. The method of claim 1 wherein applying the paint base comprises the step of painting the silver film with a paint base comprising 0.5–12% copper octoate by weight.

9. The method of claim 1 further comprising the step of coating the paint base with a UV curable resin.

10. The method of claim 9 further comprising the step of curing the UV curable resin using an ultraviolet light.

* * * * *